(12) United States Patent
Alexander, IV

(10) Patent No.: US 8,424,911 B2
(45) Date of Patent: Apr. 23, 2013

(54) FOLDING ROLLOVER PROTECTION SYSTEM WITH VIBRATION DAMPENERS

(75) Inventor: Stewart Parks Alexander, IV, Raleigh, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/219,329

(22) Filed: Aug. 26, 2011

(65) Prior Publication Data

US 2013/0049338 A1 Feb. 28, 2013

(51) Int. Cl.
*B60R 21/13* (2006.01)

(52) U.S. Cl.
USPC .......................... 280/756; 296/190.03; 16/375

(58) Field of Classification Search .................. 280/756; 296/190.03, 108, 109, 107.16, 107.17, 121; 403/100, 103, 104; 211/100, 104; 16/374, 16/375, 232
See application file for complete search history.

(56) References Cited

U.S. PATENT DOCUMENTS

| | | | |
|---|---|---|---|
| 4,949,991 A | 8/1990 | Ludwig | |
| 5,503,430 A | 4/1996 | Miki et al. | |
| 5,779,272 A | 7/1998 | Panek et al. | |
| 5,839,758 A | 11/1998 | Finch et al. | |
| 7,568,732 B2 | 8/2009 | Schlup, Jr. | |
| 7,661,709 B2 | 2/2010 | Becker | |
| 7,922,201 B2 * | 4/2011 | Kurten et al. | 280/756 |
| 7,971,905 B2 | 7/2011 | McCord et al. | |
| 8,016,320 B2 * | 9/2011 | Becker | 280/756 |
| 2005/0212278 A1 * | 9/2005 | Kurten et al. | 280/756 |
| 2007/0252371 A1 * | 11/2007 | Schlup | 280/756 |
| 2011/0095514 A1 * | 4/2011 | McCord et al. | 280/756 |

* cited by examiner

*Primary Examiner* — Drew Brown

(57) ABSTRACT

A folding rollover protection system includes an upper ROPS tube having a pair of ends hinged to a pair of ends of a lower ROPS tube. Resilient vibration dampeners are secured to each end of the lower ROPS tube and are compressed between each end of the upper ROPS tube and each end of the lower ROPS tube when the upper ROPS tube is in the upright position.

12 Claims, 4 Drawing Sheets

FOLDING ROLLOVER PROTECTION SYSTEM WITH VIBRATION DAMPENERS

FIELD OF THE INVENTION

The present invention relates to rollover protection systems on tractors, lawn and garden vehicles, riding mowers or other off road vehicles, and more specifically to folding rollover protection systems with vibration dampeners.

BACKGROUND OF THE INVENTION

For safety reasons, tractors, lawn and garden vehicles, riding mowers and other off road vehicles may be provided with some form of rollover protection system, or ROPS, to prevent the vehicle from crushing the operator if it accidentally rolls over. The ROPS should be capable of supporting the forces generated by the weight of the vehicle in the event of a rollover, maintaining free space for the operator to reduce the danger of injury.

If a cab is provided, the ROPS may be built into the cab. If a cab is not provided, the ROPS may consist of a generally U-shaped crossbar located above the head of the operator, and legs connected to the vehicle frame.

The ROPS may be straight tubing, and the legs or lower section of the ROPS may be welded to brackets and/or bolted to the vehicle frame. A ROPS is designed to absorb energy from the weight of the vehicle, and the brackets or lower section of the ROPS may transfer energy to the vehicle frame.

Some ROPS may be folded down from a raised or upright position to a lowered or folded down position. For example, U.S. Pat. Nos. 4,949,991; 5,503,430; 5,779,272; and 5,839,758 relate to ROPS that can be moved from a raised or upright position to a lowered or folded down position. The hinge assembly where the ROPS structure folds may be a rotary style joint that may be easily and quickly operated between the raised and lowered positions without tools. Retention or locking pins (e.g., rods, clips or bolts) may be inserted through holes or slots in the upper and lower ROPS, and/or through holes in hinge plates joining the upper and lower ROPS. If the retention or locking pins become loose, especially due to wear of the ROPS system, the gap between the pin and hole allows the ROPS to rattle during use. Clearances between parts including brackets, ROPS tubing and pins may be dictated by manufacturing requirements and must be relatively loose to provide a cost effective ROPS that may be easily assembled and operated. However, the clearances may result in rattling of the ROPS especially in the raised position.

There have been several attempts to solve the rattle problem. For example, tighter clearances may be required between the parts to prevent rattling, or a knob on the ROPS can be tightened to provide tension on the joint. Other examples include U.S. Pat. No. 7,568,732 for a ROPS with cushions within the hinges that take up slack in the system to minimize rattling when the structure is locked in its use position; U.S. Pat. No. 7,661,709 for a vibration dampening system for overhead frame structures; and U.S. Pat. No. 7,971,905 for a folding ROPS with a resilient wedge-shaped member that isolates the upper ROPS from the lower ROPS.

A folding ROPS is needed with vibration dampeners that can isolate the upper ROPS from the lower ROPS without rattling during use. A folding ROPS with vibration dampeners is needed that may be easily folded and locked in a raised or lowered position without tools.

SUMMARY OF THE INVENTION

A folding rollover protection system includes an upper ROPS tube pivotably mounted to a lower ROPS tube. Hinge assemblies are provided between the lower ROPS tube and the upper ROPS tube adjacent the ends. A transverse pivot member provides an axis on which the upper ROPS tube can pivot between the upright and folded down positions. A vibration dampener may be positioned and retained on the end of at least one of the ROPS tubes. The vibration dampener may be made of resilient material that is compressible and may be compressed between the ends of the upper and lower ROPS tubes if the upper ROPS tube is in the upright position.

The folding ROPS with vibration dampeners may be easily folded and locked in a raised or lowered position without tools, and can isolate the upper ROPS from the lower ROPS without rattling during use.

DESCRIPTION OF THE PREFERRED EMBODIMENT

Figure 1:
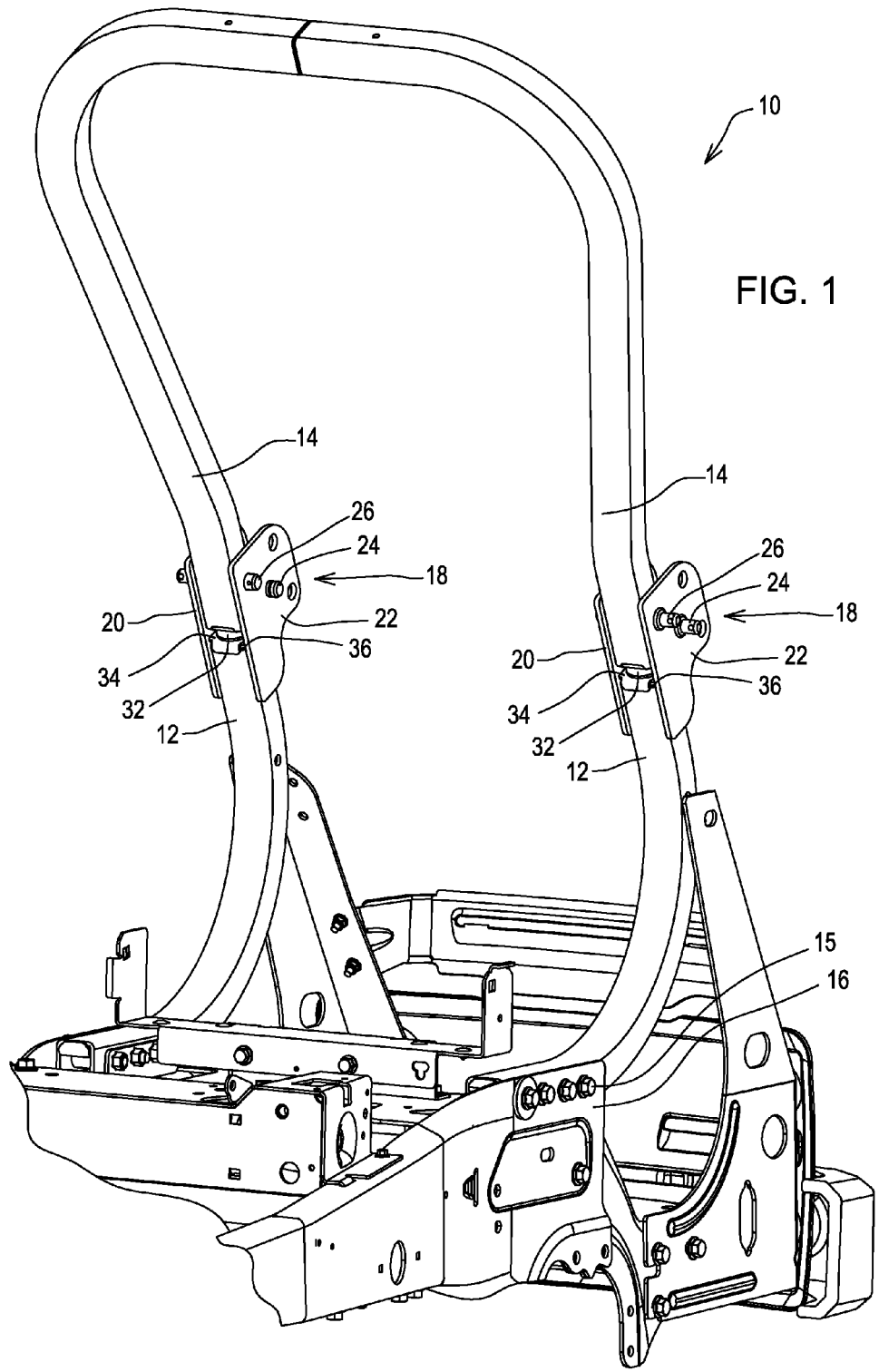
FIG. 1 is a perspective view of a folding rollover protection system in the raised position with vibration dampeners according to one embodiment of the invention.
Figure 2:
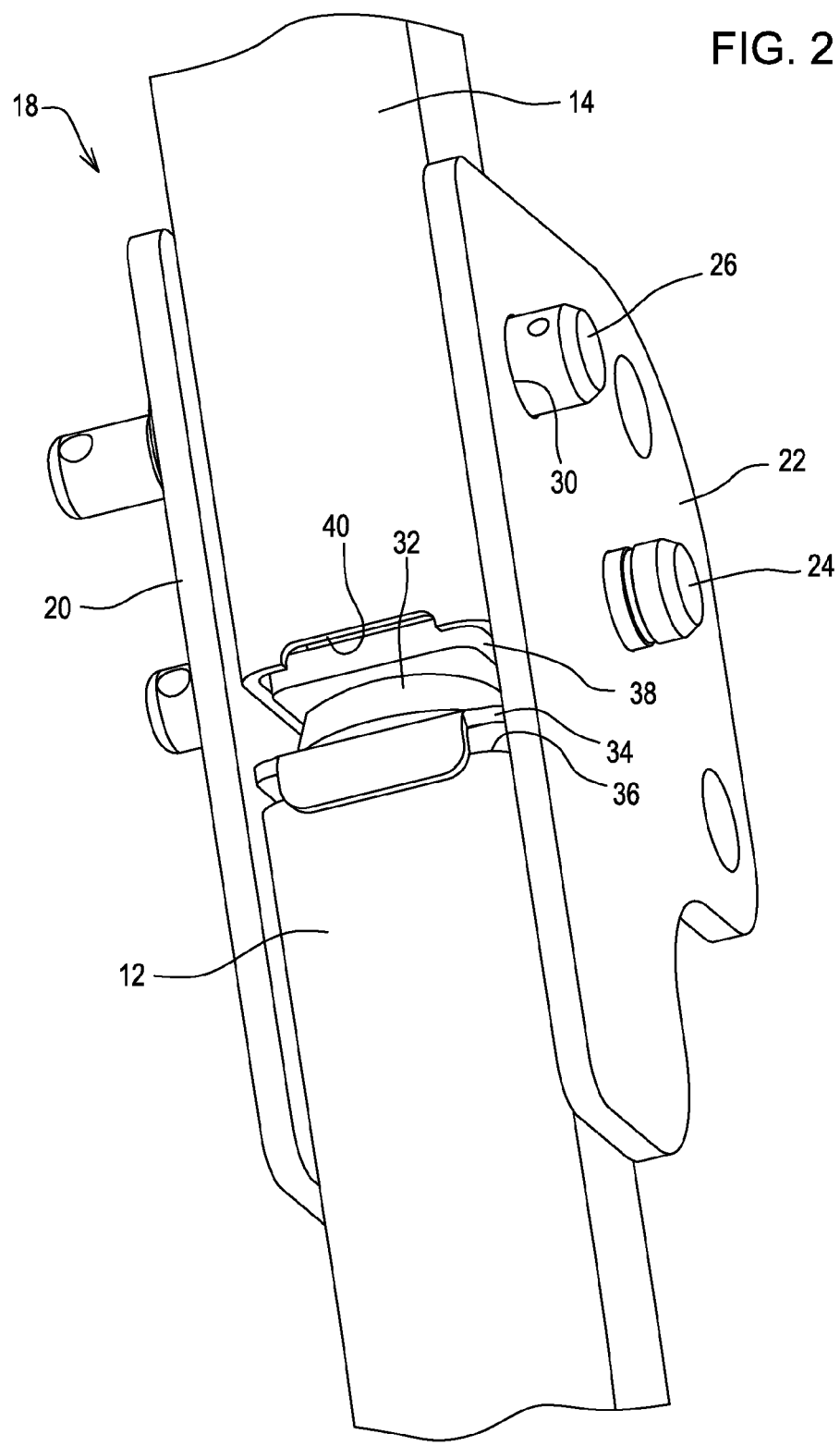
FIG. 2 is a perspective view of a hinge assembly of a folding rollover protection system with vibration dampeners, with the system in a raised position according to one embodiment of the invention.
Figure 3:
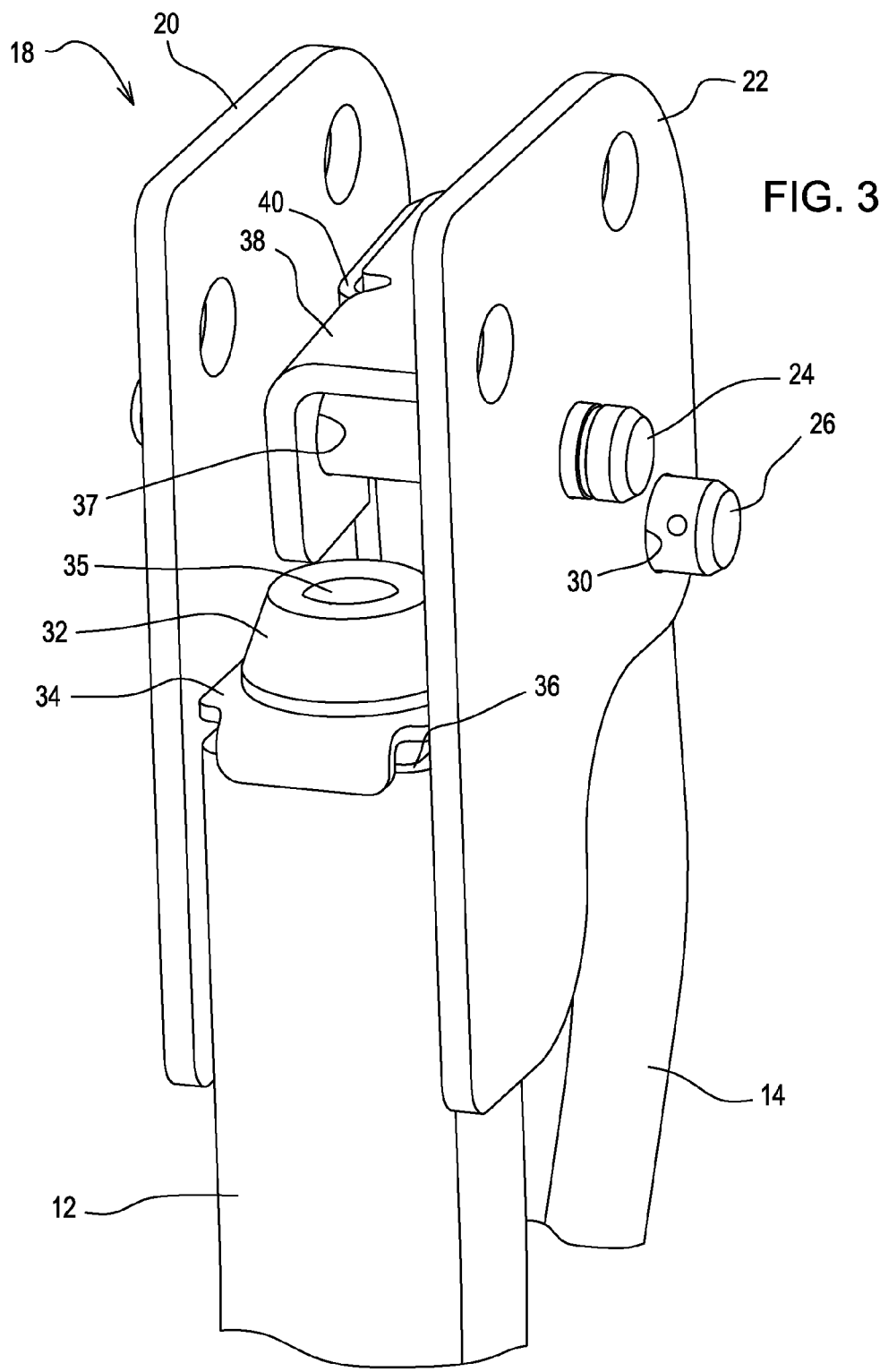
FIG. 3 is a perspective view of a hinge assembly of a folding rollover protection system with vibration dampeners, with the system in a lowered position according to one embodiment of the invention.
Figure 4:
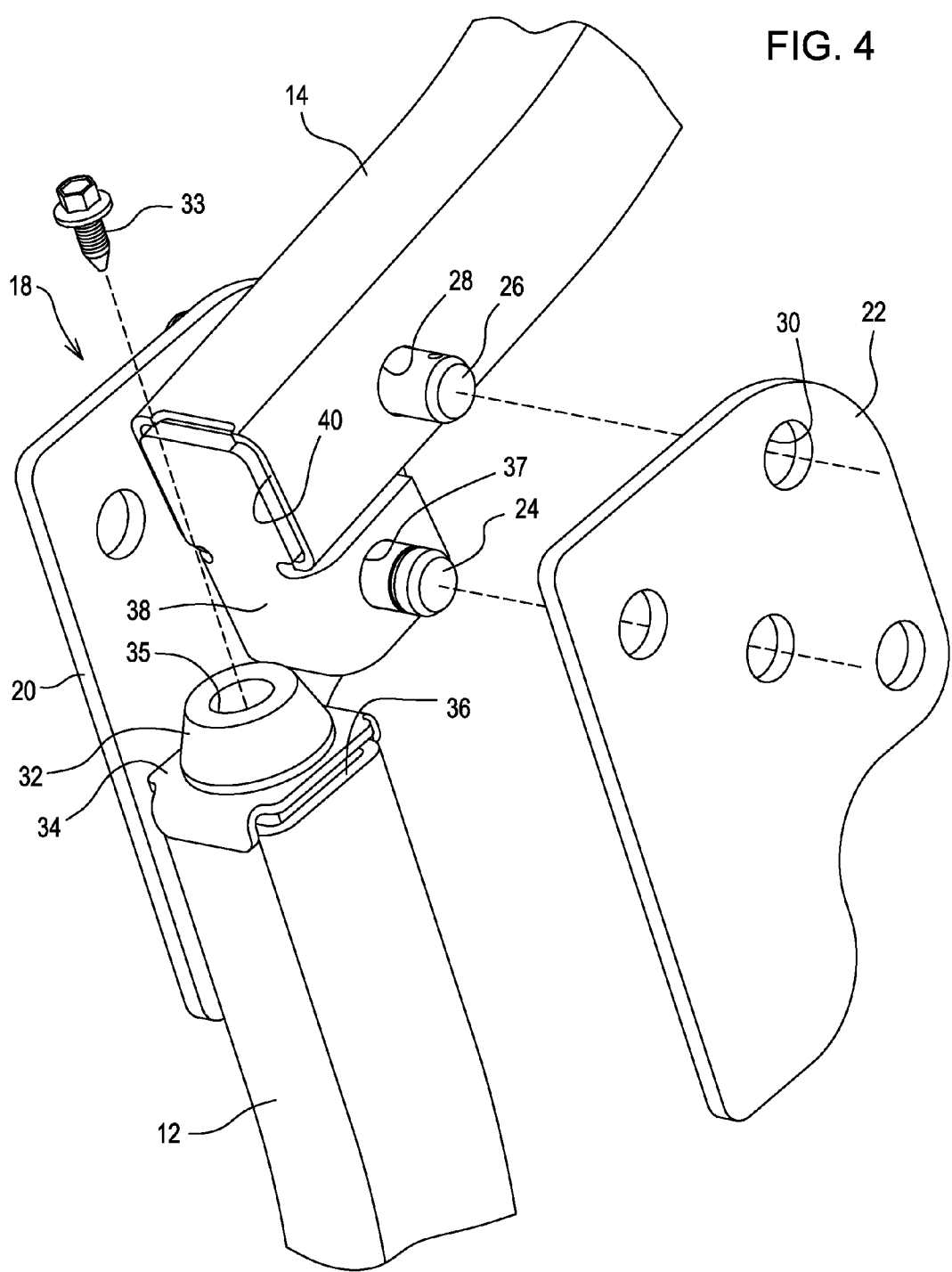
FIG. 4 is a partially exploded perspective view of a hinge assembly of a folding rollover protection system with vibration dampeners, with the system in an intermediate position according to one embodiment of the invention.

As shown in FIGS. 1-4, folding ROPS 10 may be fastened to a frame of a utility tractor, lawn and garden tractor, grass mowing machine or other off-road vehicle. The folding ROPS may be mounted to the vehicle or tractor frame on each side of an operator station, next to or behind the operator station. The folding ROPS may include a lower ROPS 12 with a pair of lower legs hinged to an upper ROPS 14 having an inverted U-shape and crossbar. The upper and lower ROPS may be tubular steel with a generally rectangular cross section, and the lower legs may be mounted or fastened using threaded fasteners 15 or welded to support brackets 16 on the tractor frame.

In one embodiment, hinge assembly 18 may be provided between each of the legs of lower ROPS tube 12 and upper ROPS tube 14. Each hinge assembly 18 may include a pair of hinge plates 20, 22 welded to the tubing walls of the lower or upper ROPS. The hinge plates may be parallel to each other, with a gap between the pair of plates that is sufficient for the tubing walls of the upper or lower ROPS tubes to slide therebetween and pivot between the raised or upright, and lowered or folded down positions.

In one embodiment, pivot member 24 may extend transversely between each pair of plates and provides an axis on which the upper ROPS tube can pivot between the upright and folded down positions. The pivot axis of pivot member 24 may be offset to the rear behind the longitudinal center axes of the upper and lower ROPS tubes. The hinge axis for the upper ROPS tube may extend through a portion of plate 38 projecting rearwardly behind the lower end of the upper ROPS tube. For example, pivot member 24 may extend through holes 37 in plate 38 which may be attached to and extends rearwardly from the lower end of upper ROPS tube 14.

In one embodiment, the folding ROPS may be secured in either of the raised or lowered positions by inserting one or more locking pins 26 through holes 28, 30 through the upper ROPS tubing walls and hinge plates respectively to secure the upper ROPS tube in either of the positions. The pins may be rods, clips or bolts. Each of the holes through the tubing walls and plates of the upper ROPS may have a diameter slightly larger than the outer diameter of locking pin 26.

In one embodiment, vibration dampeners 32 may be positioned and retained to the end of one or both of the upper and lower ROPS tubes. Each vibration dampener 32 may be rubber or other resilient material such as urethane or other thermoplastic that is compressible. The vibration dampener in the uncompressed state may have a thickness that is greater than the gap between the upper and lower ROPS tubes in the raised or upright position, and may be compressible between the ends of the upper and lower ROPS tubes as the upper ROPS tube is rotated into the raised or upright position. For example, each vibration dampener may have a hollow center portion 35 so the dampener may be readily compressed between the upper and lower ROPS tubes.

In one embodiment, plate 34 may be attached by welding or other means to the upper end 36 of lower ROPS tube 12, and plate 38 may be attached to the lower end 40 of upper ROPS tube 14. The vibration dampener may be secured with threaded fastener 33 or other fastening means to plate 34, or alternatively to plate 38. The vibration dampener in the uncompressed state may have a thickness that is greater than the gap between the plates on the upper and lower ROPS tubes with the ROPS in the raised or upright position.

The vibration dampener and/or the plate may cover or substantially cover the open end of the ROPS tubing. For example, the vibration dampener may fit into or be attached directly to the end of one or both ROPS tubes without intermediate plates, or the dampeners may be dimensioned to be inserted into the ends of one or both ROPS tubes with a compressible portion extending from the ends. The vibration dampeners may be compressed between the ends of the ROPS tubes and/or plates as the upper ROPS tube is rotated into the raised or upright position.

In one embodiment, compression of vibration dampeners 32 between the ends of the upper and lower ROPS tubes and/or plates prevents the ROPS from rattling. The compressive force generated by each vibration dampener produces a moment around the hinge assembly which urges or forces the upper ROPS tube to pivot rearwardly until locking pins 26 are placed in shear. The rearward pivoting force provided by each vibration dampener keeps the upper ROPS tube in contact with the locking pins. By keeping the upper ROPS tube in contact with the locking pins, the vibration dampeners prevent the ROPS from rattling, and eliminate or minimize any sharp impact forces generated between the upper ROPS tube and lower ROPS tube.

Having described the preferred embodiment, it will become apparent that various modifications can be made without departing from the scope of the invention as defined in the accompanying claims.

I claim:

1. A folding rollover protection system, comprising:
   an upper ROPS tube having a pair of ends hinged to a pair of ends of a lower ROPS tube and foldable between an upright position and a folded down position; and
   resilient vibration dampeners secured to and substantially covering the ends of the lower ROPS tube and compressed between each end of the upper ROPS tube and each end of the lower ROPS tube when the upper ROPS tube is in the upright position.

2. The folding rollover protection system of claim 1 further comprising a pivot member extending transversely between a pair of plates attached to the lower ROPS tube and providing an axis on which the upper ROPS tube can pivot between the upright and folded down positions.

3. The folding rollover protection system of claim 2 wherein the pivot axis of the pivot member is offset to the rear behind the lower ROPS tube.

4. The folding rollover protection system of claim 1 wherein the resilient vibration dampener has a hollow center portion.

5. The folding rollover protection system of claim 1 further comprising plates substantially covering the ends of the upper ROPS tubes.

6. A folding rollover protection system, comprising:
   an upper ROPS tube pivotably mounted to a lower ROPS tube, each of the upper and the lower ROPS tubes having a pair of ends;
   a pair of hinge assemblies provided between the lower ROPS tube and the upper ROPS tube adjacent the ends, each hinge assembly including a pair of hinge plates welded to the lower ROPS tube with a gap between the pair of plates for the upper ROPS tube to slide therebetween and pivot between the raised or upright position and the lowered or folded down position;
   a pivot member extending transversely between each pair of plates and providing an axis on which the upper ROPS tube can pivot between the upright and folded down positions; and
   a vibration dampener positioned on a plate substantially covering the end of at least one of the ROPS tubes, each vibration dampener made of resilient material that is compressible and has a hollow center portion, the dampener being compressed between the ends of the upper and lower ROPS tubes if the upper ROPS tube is in the upright position.

7. The folding rollover protection system of claim 6 wherein the pivot axis of the pivot member is offset behind the lower ROPS tube.

8. The folding rollover protection system of claim 6 wherein the upper ROPS tube includes a pair of upright portions and a crossbar.

9. A folding rollover protection system, comprising:
   an inverted U-shaped upper ROPS hinged to a lower ROPS; each of the upper ROPS and lower ROPS being tubular steel with a generally rectangular cross section;
   the upper ROPS and the lower ROPS each having a pair of ends; and
   vibration dampeners positioned to substantially cover on the ends of one of the lower ROPS and upper ROPS and being compressed as the upper ROPS is raised.

10. The folding rollover protection system of claim 9 further comprising plates over the ends of the upper ROPS and having a rearwardly extending portion through which a pivot pin extends.

11. The folding rollover protection system of claim 9 wherein the vibration dampener is rubber.

12. The folding rollover protection system of claim 9 further comprising a hollow center portion in the vibration dampener.

* * * * *